United States Patent [19]

Brueggemann

[11] Patent Number: 4,662,709
[45] Date of Patent: May 5, 1987

[54] WOBBLE CORRECTION BY TWO REFLECTORS ON AN INTERNALLY REFLECTING FACET WITHOUT BOW

[75] Inventor: Harry P. Brueggemann, San Marino, Calif.

[73] Assignee: Xerox Corporation, Stamford, Conn.

[21] Appl. No.: 633,758

[22] Filed: Jul. 23, 1984

[51] Int. Cl.$^4$ ............................................. G02B 26/08
[52] U.S. Cl. ..................................................... 350/6.7
[58] Field of Search .......................... 350/6.6, 6.7, 6.8

[56] References Cited

U.S. PATENT DOCUMENTS

| | | |
|---|---|---|
| 3,520,586 | 7/1970 | Bousky . |
| 3,604,932 | 9/1971 | Beach .................... 350/6.8 |
| 3,897,132 | 7/1975 | Meeussen ............... 350/6.7 |
| 3,909,105 | 9/1975 | Neiswander . |
| 4,002,830 | 1/1977 | Brown . |
| 4,202,597 | 5/1980 | Moore . |
| 4,247,160 | 1/1981 | Brueggemann . |
| 4,268,110 | 5/1981 | Ford . |
| 4,312,590 | 1/1982 | Harbaugh ............... 350/6.7 |

OTHER PUBLICATIONS

Minami et al. Proc. SPIE Optical Systems Engineering, vol. 193, pp. 202-208.
Proceedings of SPIE—The International Society for Optical Engineering, vol. 498, Laser Scanning and Recording, *Recent Advances in Computer Driven Laser Scanners for Graphic Arts*, by R. E. Gillespie, pp. 128-133, Aug. 1984.

*Primary Examiner*—John K. Corbin
*Assistant Examiner*—Vincent J. Lemmo
*Attorney, Agent, or Firm*—Franklin C. Weiss

[57] ABSTRACT

An internally reflecting rotating polygon system for correcting wobble by double reflection from the active facet without bow is disclosed. Instead of the impinging light source being transverse to the axis of rotation of a rotating polygon, this rotating polygon 52 having internally reflecting facets 54 at a draft angle to the axis of rotation, a collimated light source impinges upon a rotating polygon 52 with the facets 54 having the predetermined draft angle D. A., and angles of incidence at the first and second reflections. By two further reflections, 56, 58, the light is then reimpinged upon the same facet 54; wobble is similarly corrected, but with no effects of bow.

12 Claims, 7 Drawing Figures

4,662,709

WOBBLE CORRECTION BY TWO REFLECTORS ON AN INTERNALLY REFLECTING FACET WITHOUT BOW

This invention relates to an internally reflecting polygon scanner without cylinder optics wherein the effects of facet wobble are eliminated without any bow effects to the output scan line.

BACKGROUND OF THE INVENTION

Scanning systems in modern day apparatus are becoming more accurate on the one hand but more complicated and expensive on the other hand. In certain raster scanning optical image systems, a collimated souce of light, as from a laser and associated optical lenses, impinges on a rotating polygon scanner, which by the rotational movement thereof causes the reflected light to revolve about an axis near the center of rotation of the rotating polygon. This reflected light can be utilized to scan a document at the input end of an imaging system or can be used to impinge upon a photosensitive medium, such as a xerographic drum in the output mode. Many systems have been disclosed in the art to overcome various optical and other distortions in the optical flying spot imaging system.

For example, in U.S. Pat. No. 4,247,160, entitled "Scanner with Reflective Pyramid Error Compensation", issued to the same inventor and assignee as the present application, a laser beam scanner is disclosed having a positive cylinder mirror located between the polygon scanner and the photosensitive surface. The positive cylinder mirror, which has power in the cross scan plane but no power in the scan plane itself, minimizes scan to scan spot position errors due to angular alignemnt errors between adjacent facets of the polygon scanner without introducing significant cross scan field curvature. Further, this cylinder lens can be used to correct the effects of wobble introduced into the system by inaccuracies in the bearings, utilized to impart motion between the motor and the rotating polygon, and to the grinding or polishing of the actual facets on the faces of rotating polygon itself. The wobble effects cause an uneven raster scan which produces irregular locations of the output scan lines whether utilized in an input or output fashion.

Canon Kabushiki Kaisha of Tokyo has eliminated the need for wobble correction by improving the tilt accuracy of the polygon facets to five arc-seconds, and by reducing the distance from the facet to the photoreceptor. See Minami, S. and Minoura, K., Proc. SPIE Optical Systems Engineering, Vol. 193, pp. 202-208 (1979). Since wobble is an angular error, reducing this distance reduces the lateral displacement due to wobble. The distance is reduced by decreasing the number of facets, thereby increasing the scan angle for each facet, and decreasing the lens focal length for a given scan. In this paper, the writers indicate the use of an eight-facet polygon.

Eliminating cylinder lenses (1) removes the need to independently focus the scan and cross-scan planes, thus reducing alignment time, (2) reduces the number of lens elements, and (3) uses only rotationally symmetric (sperical) lenses which are cheaper to make than cylinders, greatly cutting fabrication and assembly costs. In addition, the short polygon-photoreceptor distance that Canon uses virtually eliminates the need for folding mirrors, and an eight-facet polygon is cheaper than an 18 facet polygon. By increasing the cost, or paying more for the use and manufacture of the polygon, the cost of the rest of the scanner system is reduced.

Workers at AGFA-Gevaert used double reflection at the facet to cancel wobble. After reflection from a facet, the beam is returned to the same facet by an arrangement of mirrors, for a second reflection. See Meeussen, et al, U.S. Pat. No. 3,897,132, assigned to AGFA-Gevaert. If there are an even number of reflections between facet reflections, wobble introduced at the first reflection is cancelled at the second. The cancellation is exact at the center of scan, where the wobble angle at the second reflection has the same value as the wobble angle at the first reflection. As the facet is rotated from the center of scan, the wobble angle at the second reflection is less than at the first, and cancellation is no longer exact. But over a small polygon rotation angle, wobble correction is nearly exact.

The Meeussen patent defines wobble as a deviation of the facet from parallelism with the axis of rotation. Thus, Meeussen's facet must be parallel to the axis and the patent does not consider draft angles. When the beam is offset in the cross-scan direction with a zero-draft angle polygon, bow is inevitable. If the embodiment in the Meeusen patent is analyzed, it can be shown that wobble is well corrected over the scan, but bow is excessive. The ends of a nine inch scan line are displaced at least three quarters of an inch from the center of scan in the cross-scan direction.

In copending application, Ser. No. 532,323, the same inventor as herein has disclosed a polygon system for correcting wobble by double reflection from the active facet without bow. Instead of impinging light source being transverse to the axis of rotation of a rotating polygon, this rotating polygon having facets essentially parallel to the axis of rotation, there is disclosed a light soure impinging upon a rotating polygon with the facets having the predetermined draft angle wherein by two further reflections, the light is then reimpinged upon the same facet, wobble is similarly corrected, but now with no effects of bow.

According to the present invention, a rotating polygon scanner system is disclosed for correcting wobble by double reflections from an active internally reflecting facet wthout bow. There is disclosed a light source, impinging upon an internally reflecting rotating polygon with the facets having the predetermined draft angle. By two further reflections from externally placed fixed mirrors, the light is then reimpinged upon the same facet, wobble is corrected, again with no effects of bow.

DESCRIPTION OF THE DRAWINGS

For a more complete understanding of the invention, reference may be had to the following detailed description of the invention in conjunction with the drawings wherein.

DETAILED DESCRIPTION OF THE INVENTION

In order to reduce the effects of bow, and as originally set forth in said copending application the inventor herein has discovered the various relationships between the three design variables, (1) angle of incidence at the first reflection, (2) angle of incidence at the second reflection, and (3) the draft angle, which yields perfect correction for bow over a scan angle of about 60 degrees (30 degrees on each side of the center of scan). These relations cover all possible designs.

Mathematically, bow can be expressed by a power series equation:

$$\beta = aS^2 + bS^4 + cS^6 \ldots$$

where $\beta$ is the deviation of the scan line from straightness, S is the scan angle, a is the coefficient of the second order term, b is the coefficient of the fourth order term, c is the coefficient of the 6th order term, and so on. Since bow is symmetrical about the center of scan, there are only even powers in this power series. Odd powers cannot exist since they change in sign when S changes sign and symmetry would be destroyed.

Figure 3:
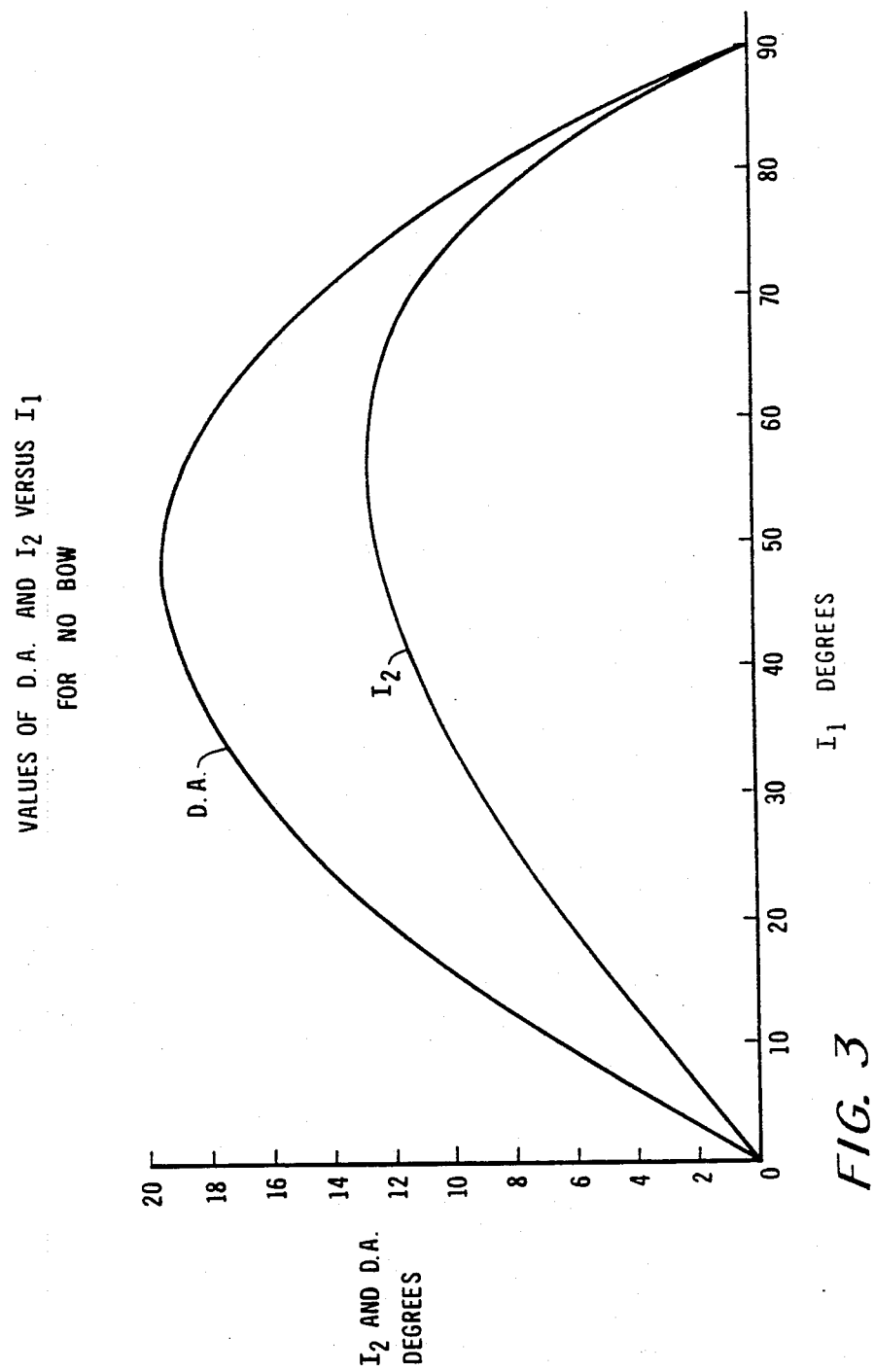
FIGS. 3 and 4 are representative curves showing the various relationships between the various angles of the mirrors and reflective surfaces of the invention described in said copending application.

The largest effect comes from the second order term. If a is zero, bow is zero over several degrees near the center of scan. The curve labeled 12 in FIG. 3 shows the relation between the angles of incidence, which make the coefficient of the second order term a equal to zero. In this curve, the angle of incidence at the second reflection (I2) is plotted against the angle of incidence at the first refelction (I1). The draft angle has no effect on the second order term. By keeping scan angles small, the higher order bow can be kept under 0.01 inches (0.254 mm) at the ends of the scan, which is not perceived over a distance of 10 inches (25.4 cm).

If, in addition, b is zero, bow is zero over twenty or thirty degrees from the center of scan, and insignificant over even larger scan angles. This removes the constraint on scan angles. The curve labeled D.A. in FIG. 3 shows the relation between the angles of incidence and the draft angle (D.A.) which makes the coefficient b equal to zero. The residual sixth order bow is insignificant for any except the most extreme scanner applications.

In a practical embodiment of this invention, it is not necessary to make bow exactly equal to zero. If the relationships of FIG. 3 are approximately met, bow will be small enough to be acceptable in many applications.

An example design was developed which satisfied the two relations shown in FIG. 3. The value of I1 was 80.6295 degrees, I2 was 7.0 degrees and D.A. was 8.01 degrees. Over a 20 degree scan, writing a line 9 inches (23 cm.) long, bow was everywhere less than two millionths of an inch (0.0000254 mm).

The novelty of the present and copending inventions are that they corrects the effect of facet wobble by a less expensive method than used heretofore. Wobble correction is perfect at the center of scan, because any angular deviation of the beam at the first reflection, due to facet wobble, is exactly removed at the second reflection. But away from the center of scan, the beam at the first reflection is not in the same plane as it is at the second reflection. The facet has a different angular tilt in each plane, the net effect being that the angular deviation of the beam at the first reflection is not quite cancelled at the second reflection. This leaves some residual wobble, which is proportional to the square of the scan angle. The equation is:

$$W = kS^2 V$$

where W is the wobble in milliradians, k is the coefficient of the second order term in the units of milliradians/(radians of scan)$^2$/(milliradians of facet wobble), S is the scan angle in radians, and V is the facet wobble in milliradians. The scan angle is the direction of the beam after the second reflection from the facet, referenced to the center of scan zero. The power series is not carried out to higher order terms because the second order term is so large, and there is no effective way to eliminate the second order term.

The coeffiecient of the second order term, k is a function of scan angle and I1 only, in the power series equation. It is affected very little by changing the values of I2 and D.A. although, of course, bow is strongly affected by these values of I2 and D.A. as well as I1.

Figure 4:
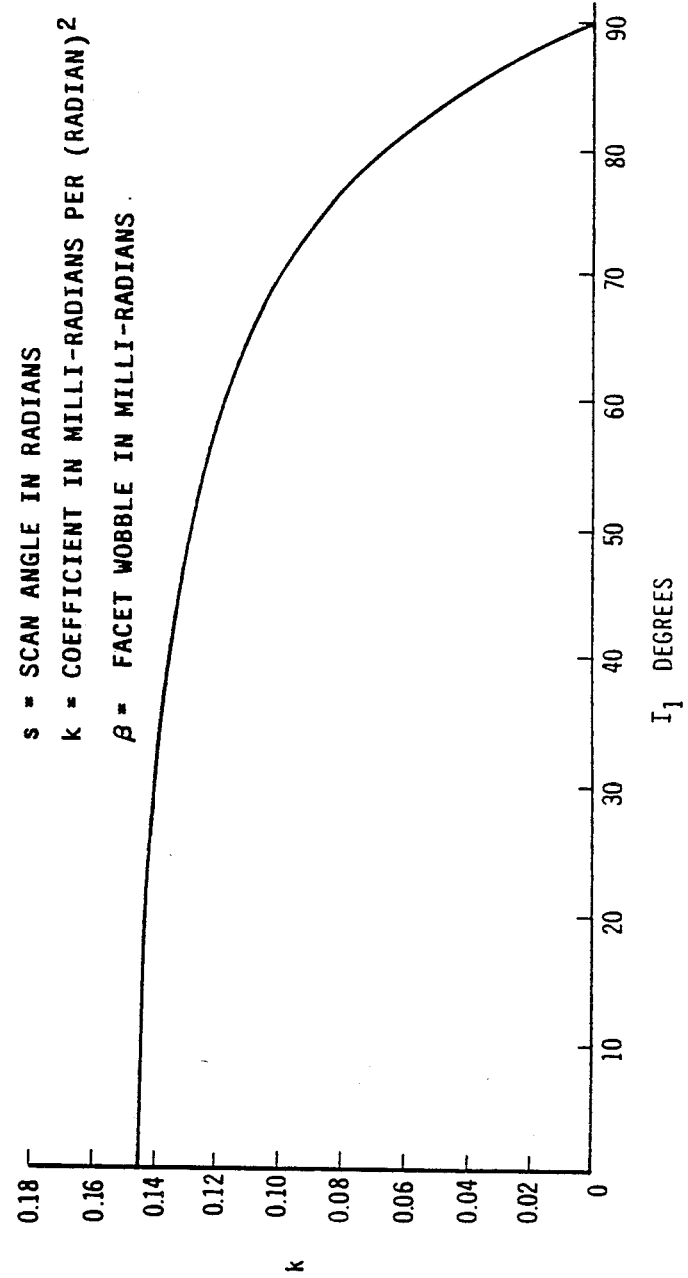

The value of the coefficient k is shown in FIG. 4 as a function of I1. It goes from the value of 0.145 at I1=0, to 0 at I1=90°. The value of I1=90° is not a useful point, because the scan angle is always 0 and the scanner cannot scan. However, it is evident from the figure that wobble is reduced for a given scan angle, when the angle of incidence at the first reflection is large.

Figure 1:
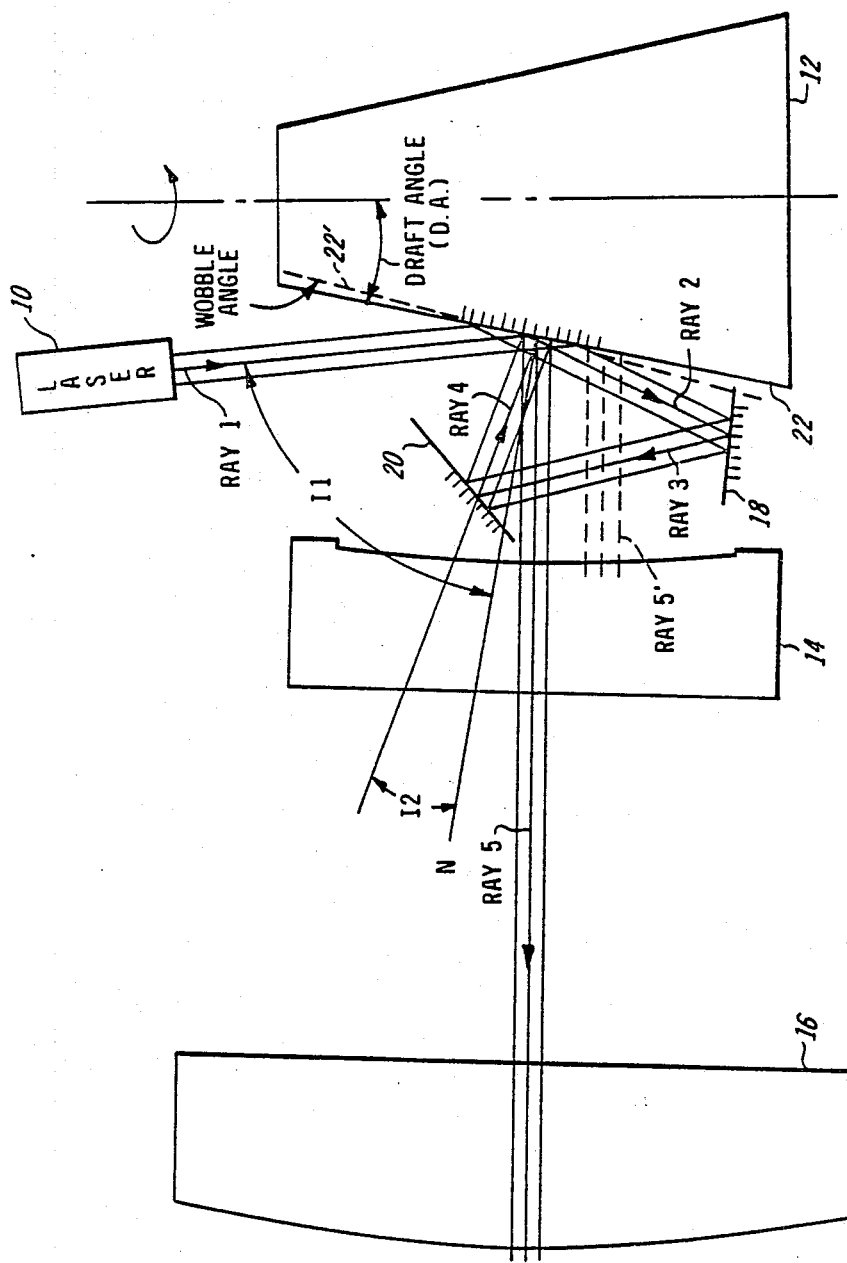
FIG. 1 is a respective schematic diagram of the rotating polygon system in accordance with the principles of the invention described in Ser. No. 532,323.

An example of the invention disclosed in said copending application is seen in FIG. 1, which is a section through the center of scan. Rotating polygon 12 is seen to rotate about a line denoted as the axis of rotation. This polygon could have any number of facets, while for this application, the rotating polygon has eight or so distinct facets. Rather than having the plane of each facet parallel to the axis of rotation, as shown by Meeussen, the facets are tilted at an angle toward the axis at an angle denoted as the "draft angle" (D.A.). Impinging upon one facet 22 of rotating polygon 12, is the light from laser 10. No optics are shown between the laser 10 and facet 22 for ease of illustation, but certain optics could be necessary depending upon the type of laser chosen. Ray 1 coming from the laser is co-planar with the axis, and is directed to facet 22 of rotating polygon 12. The light strikes the polygon and is reflected off with the normal angle of incidence equalling the angle of reflection. This angle I1 is defined in FIG. 1 as the angle between laser ray 1 and the surface of facet 22 as measured from the normal to the surface 22.

For this definition of I1, the normal to the facet 22 is taken to be in the plane of the paper, and is co-planar with the axis and with ray 1. This position of the normal is defined as the center of scan. After the light is reflected by facet 22, it travels to mirror surface 18. Thus, ray 2 is ray 1 reflected by facet 22. Whereas ray 1 is stationary in space regardless of the position of the polygon, ray 2 rotates as the polygon rotates. Mirror surface 18 must be large enough in the direction perpendicular to the paper so that ray 2 strikes it at all times during the active scan of facet 22. Ray 2 is reflected from mirror surface 18, and is shown as ray 3. From surface 18 the ray 3 travels to mirror surface 20, from which it is reflected as ray 4, seen in FIG. 1. Since ray 3 is rotating at the same angular rate as ray 2, the mirror surface 20 must be even larger than surface 28 to reflect ray 3 during active scan, because surface 20 is optically further from the facet 22 than surface 18. Ray 4 now travels back to surface 22, still with the same angular rate it had after being reflected from 22 as ray 2. Since the facet is rotating and ray 4 is also moving in the same direction as the facet, facet 22 need not be as large as mirror surface 20. The spacing between mirrors 18 and 20, and facet 22, must be kept small so that the mirrors and facet do not become too large. One skilled in the art of designing underfilled facet scanners will know how to choose the correct values of the laser beam parameters, so that the mirrors and the polygon do not become too large.

Ray 4 has many angles of incidence with facet 22 during the scan, because it rotates as the polygon rotates. Only one of these angles is defined as I2 in FIGS. 1 and 3, this is the angle between ray 4 and the normal to facet 22 in the plane of the paper as in FIG. 1. After reflection again by facet 22, ray 4 becomes ray 5, which is the ray that is corrected for facet-to-facet wobble, and at the same time will have no bow, after focussing by lens system 14 and 16.

The property possessed by ray 5 that makes it corrected for wobble and free of bow, is that when it is projected onto the plane of the paper (center of scan position) of FIG. 1, it is always parallel to itself. At various positions during the active scan the ray 5 moves over the surface of facet 22, and its projection onto the center of scan positon will be translated from the position of ray 5, but it will remain parallel to itself during this translation. This property is imparted to ray 5 when the angles I1, I2 are related according to FIG. 3. This property will extend over a larger scan angle when angle D.A. is related to the other two angles according to FIG. 3. If the facet following facet 22 (facet 22') has a different draft angle than facet 22, or if the bearings supporting the polygon impart a tilt to the axis of rotation, the projection of ray 5' from facet 22' will be displaced from the projection of ray 5, as shown in FIG. 1. Buy ray 5' will be parallel to ray 5 because of the double reflection principle taught by Meeussen et al.

The beam surrounding ray 1 is collimated, all rays of the beam are prallel to each other. Mirror surfaces 18 and 20, as well as the facet 22, are all flat surfaces, with no optical power. Thus the beam surrounding ray 5 is stil collimated. A scan lens following the facet 22 will focus the parallel rays of the collimated beam around ray 5 as a small spot at a document or a photosensitive surface.

The projection of ray 5' and the collimated beam around it are all parallel to the projection of ray 5, and thus will also focus at the same small spot as the beam around ray 5. Since the projection onto the plane of the paper of all rays is the same point at the document or the photosensitive surface, then in three-dimensional space they must all lie on a straight line perpendicular to the plane of the paper. This is the scan line at the document or photosensitive surface, and since it is straight, it has no bow. Facet 22' may have a different draft angle than facet 22, but the scan from facet 22' is superimposed over the scan of facet 22, thus there is no wobble at the document or photosensitive surface.

For the conventional polygon whose facets are parallel to the axis of rotation, the angular velocity of a ray reflected from a facet of this polygon is constant, when the angular velocity of the polygon itself is constant. For the copending invention, the angular velocity of ray 5 is not constant. It is slower at the ends of scan than at the center of scan, even though the angular velocity of the polygon is constant. If the scan lens following the conventional polygon has no otpical distortion, the velocity of the scanning spot at the document or photosensitive surface is not constant. It travels faster at the ends of scan than at the center of scan, because the spot is greater distance from the polygon at the ends of scan than at the center. An advantage of the present invention is that the spot velocity at the end of scan is closer to the velocity at the center of scan. Not as much optical distortion need be designed in the scan lens as for the scan lens of the conventional polygon to obtain a constant spot velocity at the document or photosensitive surface.

Figure 2B:
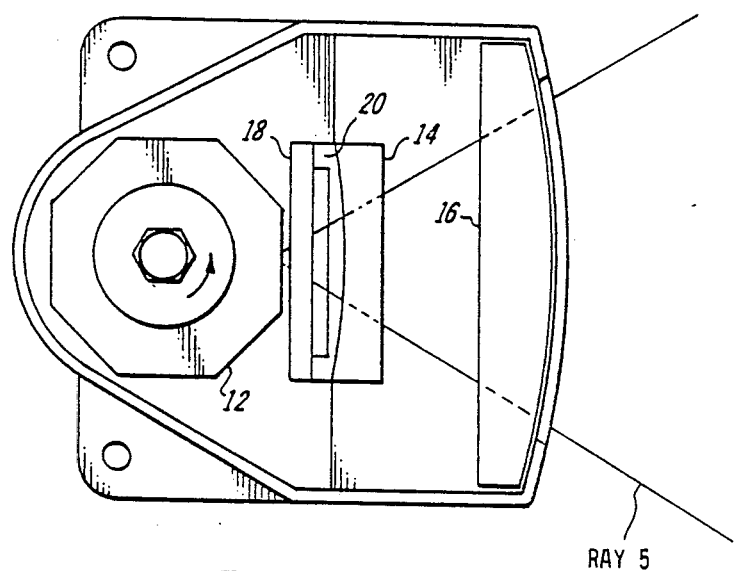
FIGS. 2a and 2b show, respectively, the front and top views of a rotating polygon system of said copending application as could actually be built.
Figure 2A:
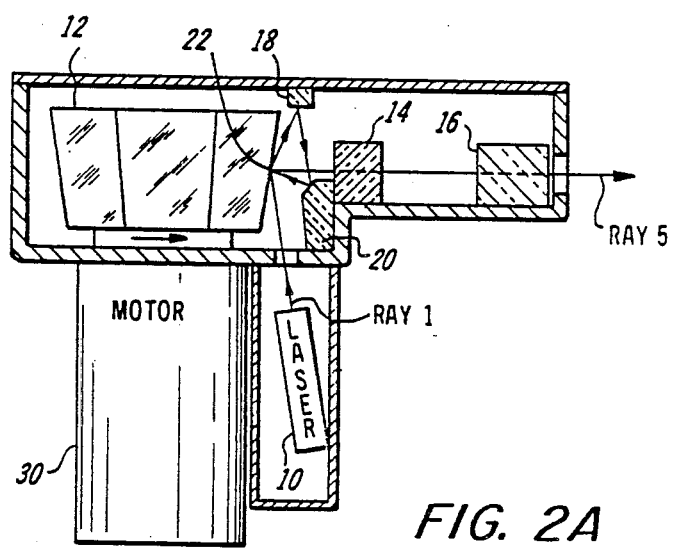

Referring now to FIGS. 2a and 2b, an actual reduction to practice of the schematic diagram of FIG. 1 is shown. FIG. 2a shows the side view wherein motor 30 on an axis turns rotating polygon 12 in the direction shown by the arrow. Laser 10 emits light ray 1 which is directed towards the facet surface 22 wherein the light is reflected towards mirror surface 18. The light is then reflected towards mirror 20 where it is then reflected back toward facet 22. After the light is impinged upon facet 22 again for the second time, the light is directed out toward the right as ray 5. For ease of illustration, rays 2 to 4 are not delineated as such but the light paths are shown clearly. Lenses 14 and 16 are seen in FIG. 2a. FIG. 2b shows the top view of the system shown and described in conjunction with FIG. 2a wherein can be seen the rotating polygon 12, reflecting surfaces 18 and 20, together with lenses 14 and 16. Due to the draft angle of the lens 12, the output light from laser 10 is then scanned through part of the rotational travel of the mirror as shown in FIG. 2b.

Figure 5:
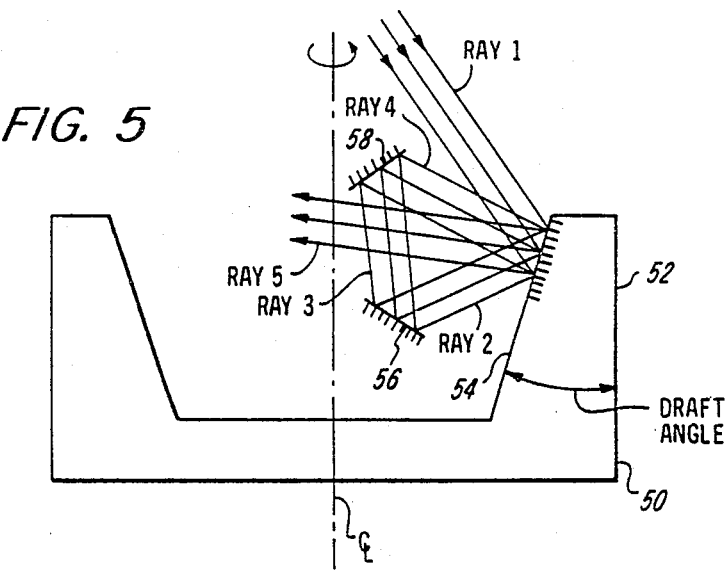
FIG. 5 is a schematic diagram of the rotating, internally reflecting, polygon system in accordance with the principles of the present invention.

FIG. 5 shows a schematic rendition of the present invention utilizing an internally reflecting rather than externally reflecting polygon scanner as set forth above. In FIG. 1, the axis of the rotation of the polygon scanner is in a positive direction from the reflecting facet. In FIG. 5, the center line of rotation of this internally reflecting rotating polygon 50 is to the left (in the Figure), or the negative direction in any empirical formulations. The side 52 of the polygon 50 is shown parallel to the center line so as to accurately depict the draft angle of the internally reflecting facet, but the outside surface 52 could be any convenient configuration. The description of the operation of Figue 5 is very similar to that of FIG. 1. That is, Ray 1, which could be a collimated light beam as from a laser (see FIG. 1), would be directed to surface 54 of polygon 50. Ray 1 would be reflected from surface 54 and now is termed Ray 2. This ray would be relected by mirrored surface 56 toward mirrored surface 58. This ray is Ray 3. From surface 58 incoming Ray 3 is reflected, Ray 4, and directed back to surface (facet) 54 of polygon 50. This second reflection, Ray 5, is now directed out from the area of the polygon 50 toward the lens arrangement seen in FIG. 1 or FIG. 5.

Because polygon 50 is rotating about its axis as shown, facet surface 54 does not remain in the position as shown to be perpendicular to the page on which FIG. 5 is drawn. It would only be in said normal position at one point in the facet's movement past the range of Ray 1. Thus, the reflected light from surface 54, Ray 2 would take more space on surface 56 than on surface 54. Similarly, Ray 3 moves in conjunction with Ray 2 and would, in turn, take more space on surface 58 than on surface 56. As set forth for the embodiment in FIG. 1, the constructor of this internally reflected rotating plygon scanner would have to take into account the necessity for bigger surfaces for mirrors 56 and 58. The mirrors would be placed as close as practicable to surface 54 so as to limit the size of the required mirror surfaces 56 and 58. As the facet rotates, it also translates, but because the radius of the polygon is negative, it translates in the direction opposite to the translation of ray 4. Facet 54 must be even larger than mirror surface 58, in the direction of scan, to intercept all positions of ray 4. Because the facets are larger, the diameter of the polygon is larger than the external reflection polygon shown in FIG. 1.

Figure 6:
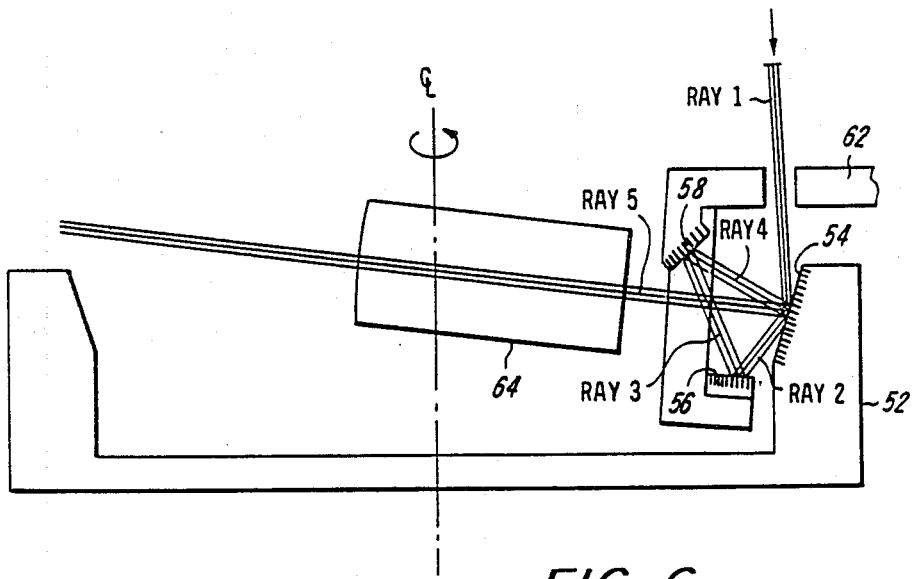
FIG. 6 is a view of an internally reflecting polygon scanner system as could actually be built.

FIG. 6 shows a typical structure for the polygon scanner 60 of the present invention. The light source, not shown in FIG. 6, would be fixedly mounted to project Ray 1 through a hole or slot in support 62. This support 62 would be fixedly mounted to the external frame of the scanner 60. The reflecting surfaces in FIG. 6 have the same designations as set forth in FIG. 5. Thus, Ray 1 becomes Ray 2 after reflection by facet surface 54. Ray 2 becomes Ray 3 after reflection by mirror surface 56. Ray 3 becomes Ray 4 after reflection by mirror surface 58. Ray 4 becomes Ray 5 after the second reflection by facet surface 54. Ray 5 is the corrected light beam after any wobble effects are removed by the four reflections. Such reflections also cancel out any bow effects due to the rotational movement of the facet surface 54 caused by the draft angle.

Ray 5 could consist of varying parallel rays of light depending on whether any wobble is introduced with the rotational movement of the scanner. Such parallel rays are focussed into one moving spot of light by lens or lens arrangement 64, as described above for the embodiment in FIG. 1.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A system for correcting wobble errors in a mirror scanning system with minimal first and second bow effects, said bow effects including at least first and second aspects thereof, comprising a scanning mirror having an axis of rotation and a radius of rotation, with the reflecting surface of the mirror facing the axis of rotation, so that light reflected from the scanning mirror travels in the general direction of the axis of rotation, a light source for introducing a source of light toward said scanning mirror, said light being reflected by said scanning mirror, a plurality of fixed mirrors to reflect and direct the first reflected light from said scanning mirror, said fixed mirrors being placed in the path of said reflected light from said scanning mirror, and consecutively reflecting said light from each of said pluality of fixed mirrors back to the same surface of said scanning mirror, the number of reflections from said plurality of fixed mirrors being even in number, the second reflection from said scanning mirror being a scanning light beam of predetermined range of arc of one revolution of said scanning mirror, said scanning mirror having a draft angle with respect to the axis of rotation of said scanning mirror, said draft angle being within a predetermined range of angles, the angles of incidence of said first and said second reflections from said scanning mirror being in a first predetermined angular relationship to each other, said plurality of fixed mirrors being in a second predetermined angular relationship to each other so as to also satisfy said first predetermined angular relationship, the angle of incidence of said first reflection from said scanning mirror and said draft angle of said scanning mirror being in a third predetermined angular relationship to each other, the scanning beam having essentially no wobble effects as a result of the reflection back to the same surface of said scanning mirror, and essentially no first bow effect as a result of the said first and second predetermined angular relationship, and essentially no second bow effect as a result of the third predetermined angular relationships.

2. A system for correcting wobble errors in a mirror scanning system with minimal first and second bow effects, said bow effects including a second order polynomial component effect and a fourth order polynomial component effect, comprising a scanning mirror having an axis of rotation, and a radius of rotation, with the reflecting surface of the mirror facing the axis of rotation, so that light reflected from the scanning mirror travels in the general direction of the axis of rotation, or that light incident on the scanning mirror travels from the general direction of the axis of rotation, a light source for introducing a source of light toward said scanning mirror, said light being reflected by said scanning mirror, a plurality of fixed mirrors to reflect and direct the first reflected light from said scanning mirror, said fixed mirrors being placed in the path of said reflected light from said scanning mirror, and consecutively reflecting said light from each of said plurality of fixed mirrors back to the same surface of said scanning mirror, the number of reflections from said plurality of fixed mirrors being even in number, the second reflection from said scanning mirror being a scanning light beam of predetermined range of arc of one revolution of said scanning mirror, said scanning mirror having a draft angle with respect to the axis of rotation of said scanning mirror, said draft angle being within a predetermined range of angles, the angles of incidence of said first and said second reflections from said scanning mirror being in a first predetermined angular relationship to each other, said plurality of fixed mirrors being in a second predetermined angular relationship to each other so as to also satisfy said first predetermined angular relationship, the angle of incidence of said first reflection from said scanning mirror and said draft angle of said scanning mirror being in a third predetermined angular relationship to each other, the scanning beam having essentially no wobble effects as a result of the reflection back to the same surface of said scanning mirror, and essentially no bow effect of the second order polynomial component as a result of the said first and second predetermined angular relationship, and essentially no bow effect of the fourth order polynomial component as a result of the said third predetermined angular relationship.

3. The system as set forth in claim 2 wherein said draft angle is within a predetermined range of angles, said light source having an angle of incidence I1 with the normal to the surface of said scanning mirror, said angle I1 being in said third predetermined relationship with said draft angle, said third predetermined relationshp exibiting one possible angle I1 when said draft angle is at the said limit of said range of angles but selectable from a choice of two angles when said draft angle is within the said predetermined range of angles, said plurality of fixed mirrors reflecting said light back to said surface of said scanning mirror at an angle I2 with the same normal to said surface of said scanning mirror, the relationship of the angle I1 and I2 having a first predetermined relationship to each other, said first predetermined relationship causing complete elimination of the effects of the second order polynomial component of bow, the relationship of the angle I1 and draft angle to each other having said third predetermined relationship, said third predetermined realtionship causing complete elimination of the effects of the fourth order polynomial component of bow.

4. The system as set forth in claim 3 wherein I1 is 30.0000 degrees, I2 is 9.1623 degrees, and the draft angle is 16.530 degrees.

5. The system as set forth in claim 3 wherein I1 is 60.0000 degrees, I2 is 12.6601 degrees, and the draft angle is 17.968 degrees.

6. The system as set forth in claim 3 wherein said scanning mirror is a multi-surface mirror comprising a rotating polygonal array of mirror surfaces, said light being reflected in turn by each of said surfaces of said multi-surface mirror.

7. The system as set forth in claim 2 wherein said draft angle is within a predetermined range of angles, said light source having a first angle of incidence approximately at said angle I1 with the normal to the surface of said scanning mirror, said angle I1 being in said third predetermined relationship with said draft angle, said third predetermined relationship exhibiting one possible angle I1 when said draft angle is at the said limit of said range of angles but selectable from a choice of two angles when said draft angle is within the said predetermined range of angles, said plurality of fixed mirrors reflecting said light back to said surface of said scanning mirror at a second angle of incidence I2 with the same normal to said surface of said scanning mirror, the relationship of the angle I1 and I2 having said first predetermined relationship to each other, said first and second reflected light from said scanning mirror having incidence angles approximate to said first predetermined relationship causing bow effect of the second order polynomial to be sustantially reduced as a result of the said first and second reflected light from said scanning mirror having incidence angles approximate to said first predetermined angular relationship, said first reflected light from said scanning mirror having incidence angle approximate to said third predetermined relationship causing bow effect of the fourth order polynomial to be substantially reduced as a result of the said first reflected light from said scanning mirror having incidence angle approximate to said third predetermined angular relationship.

8. The system as set forth in claim 7 wherein said scanning mirror is a multi-surface mirror comprising a rotating polygonal array of mirror surfaces, said light being reflected in turn by each of said surfaces of said multi-surface mirror.

9. The system as set forth in claim 2 wherein bow is defined as $$\beta = aS^2 + bS^4$$

where "$\beta$" is the deviation of the scan from straightness, "S" is the scan angle, "a" is the coefficient of said second order polynomial component and is under the influence of the angular relationship of said angles of incidences of said first and second reflections from said scanning mirror, where said first predetermined relationship of I2 to I1 provides a coefficient "a" of zero, and "b" is the coefficient of the said fourth order and is under the influence of the the angular relationship of the incidence angle of said first reflection from said scanning mirror and said draft angle, where said third predetermined relationship of draft angle and I1 provides a coefficient "b" of zero.

10. A system for correcting wobble errors in a mirror scanning system with minimal first and second bow effects, said bow effects including a second order polynomial component effect and a fourth order polynomial component effect, comprising a scanning mirror having an axis of rotation and a radius of rotation, with the reflecting surface of the mirror facing the axis of rotation, so that light reflected from the scanning mirror travels in the general direction of the axis of rotation, or that light incident on the scanning mirror travels from the general direction of the axis of rotation, a light source or introducing a source of light toward said scanning mirror, said light being reflected by said scanning mirror, a plurality of fixed mirrors to reflect and direct the first reflected light from said scanning mirror, said fixed mirrors being placed in the path of said reflected light from said scanning mirror, and consecutively reflecting said light from each of said plurality of fixed mirrors back to the same surface of said scanning mirror, the number of reflections from said plurality of fixed mirrors being even in number, the second reflection from said scanning mirror being a scanning light beam of predetermined range of arc of one revolution of said scanning mirror, said scanning mirror having a draft angle with respect to the axis of rotation of said scanning mirror, said draft angle being within a predetermined range of angles, the angles of incidence of said first and said second reflections from said scanning mirror being in a first predetermined angular relationship to each other, said plurality of fixed mirrors being in a second predetermined angular relationship to each other such as to also satisfty the said first predetermined angular relationship, the angle of incidence of said first reflection from said scanning mirror and the said draft angle of the said scanning mirror being in a third predetermined angular relationship to each other, the scanning beam having essentially no wobble effects as a result of the reflection back to the same surface of said scanning mirror, and essentially no bow effect of the second order polynomial component as a result of the said first and second predetermined angular relationship and essentially no bow effect of the fourth order polynomial component as a result of the said third predetermined angular relationship, with bow defined by the polynomial $$\beta = aS^2 + bS^4$$

where "$\beta$" is the deviation of the scan from straightness, "S" is the scan angle, "a" is the coefficient of said second order polynomial component and is under the influence of the angular relationship of said angles of incidences of said first and second reflections from said scanning mirror, where said first predetermined relationship of I2 to I1 provides a coefficient "a" of zero, and "b" is the coefficient of the said fourth order polynomial component and is under the influence of the the angular relationship of the incidence angle of said first reflection from said scanning mirror and said draft angle, where said third predetermined relationship of draft angle and I1 provides a coefficient "b" of zero.

11. A system for correcting wobble errors in a mirror scanning system with controlled first and second effects, said bow effects including a second order polynomial component effect and a fourth order polynomial component effect, comprising a scanning mirror having an axis of rotation and a radius of rotation, with the reflecting surface of the mirror facing the axis of rotation, so that light relected from the scanning mirror travels in the general direction of the axis of rotation, or that light incident on the scanning mirror travels from the general direction of the axis of rotation, a light source for introducing a source of light toward said scanning mirror, said light being reflected by said scanning mirror, a plurality of fixed mirrors to reflect and direct the first reflected light from said scaning mirror, said fixed mirrors being placed in the path of said reflected light from said scanning mirror, and consecutively reflecting said light from each of said plurality of fixed mirrors back to the same surface of said scanning mirror, the number of reflections from said plurality of fixed mirrors being even in number, the second reflection from said scanning mirror being a scanning light beam of predetermined range of arc of one revolution of said scanning mirror, said scanning mirror having a draft angle with respect to the axis of rotation of said scanning mirror, the angles of incidence of said first and said second reflections from said scanning mirror being in a first angular relationship to each other, said plurality of fixed mirrors being in a second angular relationship to each other so as to also satisfy the said first angular relationship, the angle of incidence of said first reflection from said scanning mirror and the said draft angle of the said scanning mirror being in a third angular relationship to each other, the scanning beam having essentially no wobble effects as a result of the reflection back to the same surface of said scanning mirror, and controlled bow effect of the second order polynomial component as a result of the said first and second angular relationship, and controlled bow effect of the fourth order polynomial component as a result of the said third angular relationship, with bow defined by the polynomial $$\beta = aS^2 + bS^4 + cS^6 + \ldots$$

where "$\beta$" is the deviation of the scan from straightness, "S" is the scan angle, "a" is the coefficient of said second order polynomial component and is under the influence of the angular relationship of said angles of incidences of said first and second reflections from said scanning mirror, where said first predetermined relationship of I2 to I1 provides a coefficient "a" of zero, and "b" is the coefficient of the said fourth order polynomial component and is under the influence of the the angular relationship of the incidence angle of said first reflection from said scanning mirror and said draft angle, where said third predetermined relationship of draft angle and I1 provides a coefficient "b" of zero, and "c" is the coefficient of a sixth order polynomial component, if any.

12. The system as set forth in claim 11 wherein said scanning mirror is a multi-surface mirror comprising a rotating polygonal array of mirror surfaces, said light being reflected in turn by each of said surfaces of said multi-surface mirror.

* * * * *